Patented Oct. 28, 1941

2,260,880

UNITED STATES PATENT OFFICE 2,260,880

COATING COMPOSITION

Arthur E. Bartlett, Haddonfield, N. J., assignor to E. I. du Pont de Nemours & Company, Wilmington, Del., a corporation of Delaware No Drawing. Application May 23, 1939, Serial No. 275,267

3 Claims. (Cl. 106—241)

This invention relates to coating compositions and more particularly to stable zinc oxide containing coating compositions.

In the heat treatment of animal or vegetable oils for the production of paint, varnish or enamel vehicles for use in the preparation of coating compositions there is a definite breakdown (reaction) of the triglycerides resulting in the liberation of free acid. The control of the free acid content involves practical difficulties which are not easily overcome. Where the acid number of the coating composition vehicle exceeds 8–10 it is practically impossible to prepare an enamel therefrom in which zinc oxide is used as a pigment. The zinc oxide reacts readily with the free acid (as oleic, linoleic, stearic, eleostearic, etc.) to form zinc soaps which are insoluble in the common varnish solvents. There results from such a reaction a highly viscous mass which in a relatively short time becomes a solid insoluble (irreversible) gel. Such a reaction takes place in the wet enamel at ordinary room temperature.

Certain fossil and other natural resins are highly acid in nature and also combine with zinc oxide if they are present in the vehicle used to prepare paints and enamels in which zinc oxide is used as a pigment. Again a highly viscous mass is formed which ultimately results in the formation of an irreversible gel.

As previously noted when the animal and vegetable oils are heat treated to increase their viscosity and drying properties the acid number increases. China-wood oil which is principally the triglyceride of eleostearic acid, however, shows a reduced acid number when it is heat treated. However, the highly bodied China-wood oil when pigmented with zinc oxide forms a gel as do the other oils so that its use is impractical.

Because of the highly desirable properties imparted to certain types of paints and enamels by zinc oxide its use is often preferred but in the present state of the art is impractical because of the gelling of the compositions.

It is therefore the principal object of the present invention to provide means for preparing coating compositions, as paints, enamels, etc., which may be pigmented with zinc oxide and will be stable with respect to viscosity. A further object is the provision of means for preparing oleoresinous coating compositions containing zinc oxide which will not gel but will possess satisfactory viscosity for application purposes. Other objects will be readily apparent as the description of the invention proceeds.

These objects are accomplished by the addition of organic silicates to coating composition vehicles containing zinc oxide hereinafter described.

The manner of carrying out the invention will be more fully understood by the following examples in which the parts are by weight:

EXAMPLE I

Metal protective enamel

| | Parts |
|---|---|
| Black East India gum | 460 |
| China-wood oil | 450 |
| Bodied Perilla oil | 150 |
| Mineral spirits | 1000 |

The composition is prepared by melting the East India gum and heating at approximately 600° F. until a loss of about 15% of volatile material has taken place. Gums or resins so treated are known as being "run." After the gum has been run the China-wood oil which has been previously heated to 350° F. is added and the mass heated with stirring to body it for at least 9 minutes at 585° F. After this heat treatment the bodied Perilla oil is added, with stirring, and then the mineral spirits is added.

To this vehicle, after cooling, is then added 20% by weight of zinc oxide paste with vigorous stirring and 5% by weight of ethyl silicate, the latter based on the total weight of vehicle and zinc oxide. The pigmented composition is then ready for use.

The zinc oxide paste comprises approximately 75% dry zinc oxide and 25% raw linseed oil.

In preparing the vehicle, bodied linseed oil may be used in place of the bodied Perilla oil. The bodied oil is prepared by heating, with stirring, the raw oil at about 585° F. for approximately 2 to 2½ hours.

The pigmented composition prepared as described is stable to gelling for a period of upwards of 4 months, whereas a similar composition prepared without the ethyl silicate gels in from 12 to 16 hours.

The composition may be applied to any type of suitably prepared metal surface by means of brushing, spraying, etc., and the coating air-dried or baked at elevated temperatures.

EXAMPLE II

*Metal protective enamel*

| | Parts |
|---|---|
| Black East India gum | 230 |
| Congo resin | 250 |
| Bodied Perilla oil | 600 |
| Mineral spirits | 1000 |

In preparing this composition the Congo resin is run at 650–685° F. to approximately 25% loss. The black East India gum is melted and heated at approximately 600° F. to a loss of about 15%. After the resins have been run, they are mixed and the Perilla oil, which has previously been heated to about 400° F., is added. The temperature of the mass is raised to approximately 585° F. and maintained at this temperature until a few drops of the material placed on a cold glass is clear (or free from haze). The heating is then discontinued and when the mass has cooled sufficiently the mineral spirits is added with suitable agitation. To this vehicle is then added 20% by weight of zinc oxide paste as used in Example I and 5% ethyl silicate based on the total weight of the other ingredients.

This pigmented composition was stable to gelling for a period of upwards of 4 months. Similar pigmented compositions containing no organic silicate gelled in from 4 to 16 hours.

The Perilla oil used in this example is bodied to a viscosity of at least Z-5 on the Gardner-Holdt scale.

Although the so-called zinc reactive vehicles consistently gel the time required for such gelling varies for some unexplained reason.

The vehicles are preferably of the oleoresinous type which for the present purpose include mixtures of resins and oils as in the above examples, or synthetic resins of the kind mentioned in the following example which are chemically modified with fatty oil.

EXAMPLE III

*Resin enamel*

| | Parts |
|---|---|
| Oil modified polyhydric alcohol-polycarboxylic acid resin | 100 |
| Zinc oxide paste | 20 |
| Ethyl silicate | 6 |

The oil modified polyhydric alcohol-polycarboxylic acid resin was a 14% China-wood oil-34% linseed oil modified glyceryl phthalate in approximately 50% solution in a mixture of aliphatic and aromatic hydrocarbon solvents. The zinc oxide paste was as used in the previous examples.

The pigmented composition, prepared in accordance with this example, was stable to gelling for upwards of 1 month, after which time the examination was discontinued. A similar composition without the organic silicate gelled in 4 days.

In addition to the tetra-ethyl ortho-silicate, other organic silicates such as the tetra furfuryl, tetramethallyl, etc., may be used with equally satisfactory results. The alkyl, alicyclic, and cyclic silicates are preferred.

The amount of organic silicate which has been found satisfactory may conveniently range between 2 and 10%, based on the total ingredients of the composition exclusive of the organic silicate. Amounts greater than 10% are unnecessary.

The present invention is applicable to the preparation of coating compositions when the vehicles are of the type containing resin acids, fatty oil acids, synthetic resins or highly bodied China-wood oil solely or in combination, and which react with zinc oxide to produce gels, thus making the pigmented compositions unsatisfactory as coating materials. These oils and resins containing free acidic material, which reacts with zinc oxide to form gelled insoluble material, are commonly designated by the trade as zinc oxide reactive vehicles. Such vehicles exhibit variations in their gelling tendency so that their manfacture and use is unreliable. The use of the organic silicate, however, definitely inhibits the formation of a gell for a protracted period of time.

Due to the dispersing tendency of reactive vehicles on zinc oxide pigment the procedure described herein is of value in simplifying pigment grinding or dispersing procedures since the present method by preventng gelling permits the mentioned dispersive tendency to be utilized. Zinc oxide may be dispersed in an unreactive material such as linseed oil (before boiling) by any of the usual methods such as the use of roller mills, ball or pebble mills, etc. But this procedure results in a pigment dispersion in which the particle size of the zinc oxide agglomerates is too large to enable the production of a glossy enamel. Additional dispersion of the zinc oxide will take place when such unreactive vehicle containing it is added to a zinc oxide reactive vehicle, e. g. with consequent reduction of the zinc oxide agglomerate particle size to the point where glossy enamels may be obtained. Such enamels, however, exhibit a tendency to continue this dispersing action to the point where gellation sets in rather rapidly. By the use of the organic silicates, as described herein, satisfactorily stable enamel compositions can be prepared. The advantages of such a procedure from the standpoint of economical production are obvious.

The organic silicate may be added to the pigmented enamel at any stage of its manufacture. It should not be added, however, to the hot vehicle or during the heating of the resins or oil in the preparation of the vehicle. They are also preferably not added after the enamel has gelled or increased in viscosity to the point where it is unusable.

The organic silicates may be used with zinc oxide reactive vehicles to produce pigmented compositions, when the pigment is solely zinc oxide or when the zinc oxide is in admixture with other pigments in amount sufficient to cause gellation.

The compositions embodied in the present invention and made from zinc reactive oleoresinous or synthetic resinous vehicles are useful as metal protective and decorative coating compositions. They may be applied in the conventional manner as by brushing, spraying, roller coating, etc., and may be air dried or baked at elevated temperatures.

This invention by a simple method makes possible the preparation of decorative and protective coating compositions containing zinc oxide and a zinc reactive vehicle. A valuable feature of my process is a reduction in the time necessary for mechanically dispersing the zinc oxide in the zinc reactive or non-reactive vehicles. A further advantage is the production of a composition containing zinc oxide in which the zinc oxide is present in a high degree of dispersion. A still further advantage is a means of producing zinc oxide containing enamels with zinc oxide reactive vehicles, which enamels are satisfactorily stable to gelling, by a simple and economical means. Other advantages will be readily apparent to those skilled in the art of preparing such compositions.

As many apparently widely different embodiments of this invention may be made without departing from the spirit and scope thereof, it is to be understood that I do not limit myself to the specific embodiments thereof except as defined in the appended claims.

I claim:

1. A coating composition resistant to gelling comprising zinc oxide, a small amount of an organic silicate, and a film-forming material which contains sufficient free acid radical to be reactive toward zinc oxide and to normally cause gelling in the film-forming material, the film-forming material in said composition consisting essentially of a substance selected from the class consisting of drying glyceride oils, resins, and resin acids derived from natural resins.

2. The coating composition set forth in claim 1 in which said vehicle is a drying glyceride oil.

3. The coating composition set forth in claim 1 in which said vehicle is a resin.

ARTHUR E. BARTLETT.